(12) United States Patent
Deshpande et al.

(10) Patent No.: US 10,808,681 B2
(45) Date of Patent: Oct. 20, 2020

(54) TWIST CORRECTION FACTOR FOR AERODYNAMIC PERFORMANCE MAP USED IN WIND TURBINE CONTROL

(71) Applicant: General Electric Company, Schenectady, NY (US)

(72) Inventors: Ameet Shridhar Deshpande, Schenectady, NY (US); Arne Koerber, Berlin (DE); Sara Simonne Delport, Rheine (DE)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 15/877,497

(22) Filed: Jan. 23, 2018

(65) Prior Publication Data

US 2019/0226451 A1  Jul. 25, 2019

(51) Int. Cl.
*F03D 7/02* (2006.01)
*F03D 7/04* (2006.01)

(52) U.S. Cl.
CPC ........... *F03D 7/0224* (2013.01); *F03D 7/028* (2013.01); *F03D 7/0276* (2013.01); *F03D 7/04* (2013.01);
(Continued)

(58) Field of Classification Search
CPC ........ F03D 7/028; F03D 7/048; F03D 7/0224; F03D 7/0276; F03D 17/00
(Continued)

(56) References Cited

U.S. PATENT DOCUMENTS 5,181,678 A * 1/1993 Widnall ................... B64O 3/48
                                                           244/219
7,175,389 B2   2/2007 Moroz
(Continued)

FOREIGN PATENT DOCUMENTS

EP         2302206 A      3/2011
WO    WO 2010/046403 A2   4/2010
(Continued)

OTHER PUBLICATIONS

Bernard Budiansky et al., "A Torsional Stiffness Criterion for Preventing Flutter of Wings of Supersonic Missiles", [Aug. 28, 1947], National Advisory Committee for Aeronautics, (p. 6) (Year: 1947).*
(Continued)

*Primary Examiner* — Igor Kershteyn
*Assistant Examiner* — Andrew Thanh Bui
(74) *Attorney, Agent, or Firm* — Dority & Manning, P.A.

(57) ABSTRACT

A method for controlling a wind turbine based on aerodynamic performance maps that account for blade twist includes controlling the wind turbine based on at least one aerodynamic performance map. Further, the method includes determining at least one speed parameter of the wind turbine. Moreover, the method includes determining a blade torsional stiffness factor. Thus, the method further includes determining, via the processor, a twist correction factor for the aerodynamic performance map as a function of the at least one speed parameter and the blade torsional stiffness factor. The method then includes applying the twist correction factor to the at least one aerodynamic performance map to obtain an adjusted aerodynamic performance map. In addition, the method includes controlling the wind turbine based on the adjusted aerodynamic performance map.

9 Claims, 7 Drawing Sheets

(52) U.S. Cl.
CPC ........ *F03D 7/048* (2013.01); *F05B 2270/327* (2013.01); *F05B 2270/328* (2013.01); *F05B 2270/708* (2013.01)

(58) Field of Classification Search
USPC .............................. 415/83; 700/287; 416/41
See application file for complete search history.

(56) References Cited

U.S. PATENT DOCUMENTS

| | | | |
|---|---|---|---|
| 7,281,891 | B2 | 10/2007 | Smith et al. |
| 7,342,323 | B2 | 3/2008 | Avagliano et al. |
| 7,346,462 | B2 | 3/2008 | Delmerico |
| 7,505,833 | B2 | 3/2009 | Delmerico et al. |
| 7,613,548 | B2 | 11/2009 | Cardinal et al. |
| 7,822,560 | B2 | 10/2010 | LeMieux |
| 7,861,583 | B2 | 1/2011 | Honhoff et al. |
| 7,942,629 | B2 | 5/2011 | Shi et al. |
| 7,979,167 | B2 | 7/2011 | Delmerico et al. |
| 8,025,476 | B2 | 9/2011 | Zheng et al. |
| 8,050,887 | B2 | 11/2011 | Ahmann |
| 8,257,040 | B2 | 9/2012 | Chen et al. |
| 8,899,922 | B2 * | 12/2014 | Fuglsang ............... F03D 1/0675 416/1 |
| 9,217,416 | B2 | 12/2015 | Spruce et al. |
| 9,605,558 | B2 * | 3/2017 | Perley .................. F03D 7/0288 |
| 10,451,036 | B2 * | 10/2019 | Herr ..................... F03D 7/0224 |
| 2007/0075546 | A1 | 4/2007 | Avagliano et al. |
| 2008/0086281 | A1 | 4/2008 | Santos |
| 2009/0047116 | A1 | 2/2009 | Barbu et al. |
| 2011/0140431 | A1 | 6/2011 | Landa et al. |
| 2012/0128488 | A1 | 5/2012 | Kristoffersen |
| 2012/0263601 | A1 | 10/2012 | Baker et al. |
| 2013/0033040 | A1 | 2/2013 | Bowyer et al. |
| 2013/0156577 | A1 | 6/2013 | Esbensen et al. |
| 2013/0204447 | A1 | 8/2013 | Bjerge et al. |
| 2013/0297085 | A1 | 11/2013 | Xiongzhe et al. |
| 2013/0302161 | A1 * | 11/2013 | Koerber ................... F03D 7/04 416/1 |
| 2014/0035285 | A1 | 2/2014 | Creaby et al. |
| 2014/0037447 | A1 | 2/2014 | Attia |
| 2015/0292483 | A1 * | 10/2015 | Slack ................... F03D 7/0276 290/44 |
| 2015/0330364 | A1 * | 11/2015 | Liu ........................ F03D 17/00 416/1 |
| 2015/0361964 | A1 * | 12/2015 | Daher Adegas ........ F03D 7/043 416/1 |
| 2016/0237988 | A1 * | 8/2016 | Perley .................. F03D 7/0288 |
| 2017/0321660 | A1 * | 11/2017 | Atzler .................. F03D 7/0224 |

FOREIGN PATENT DOCUMENTS

WO WO2013/083130 A1 6/2013
WO WO2016/078669 A1 5/2016

OTHER PUBLICATIONS

U.S. Appl. No. 15/587,670, filed May 5, 2017.
EP Search Report, dated Jun. 11, 2019.

* cited by examiner

TWIST CORRECTION FACTOR FOR AERODYNAMIC PERFORMANCE MAP USED IN WIND TURBINE CONTROL

FIELD

The present invention relates generally to wind turbines, and more particularly, to twist correction factors for aerodynamic performance maps used in wind turbine controllers that account for blade twist and/or torsional stiffness.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Changes in atmospheric conditions, for example, wind speed, wind turbulence, wind gusts, wind direction, and density may significantly influence power produced by the generator. A power output of the generator increases with wind speed until the wind speed reaches a rated wind speed for the turbine. At and above the rated wind speed, the generator operates at a rated power. The rated power is an output power at which the generator can operate with a level of fatigue or extreme load to turbine components that is predetermined to be acceptable. At wind speeds higher than a certain speed, typically referred to as a trip limit, the wind turbine may implement a control action, such as shutting down or de-rating the wind turbine in order to protect wind turbine components from damage. In addition, there may be certain wind speeds and/or operational set points (such as generator speed or power) that lead to a corrective action (such as a pitch control action) below rated power.

In certain control systems, such as the system described in U.S. Pat. No. 9,605,558 filed on Aug. 20, 2013 entitled "System and Method for Preventing Excessive Loading on a Wind Turbine" which is incorporated herein by reference in its entirety, a wind condition is estimated using wind turbine operating data, a series of equations, and one or more aerodynamic performance maps. The aerodynamic performance map(s) are dimensional or non-dimensional tables or graphs that describe rotor loading and performance (e.g. power, thrust, torque, bending moment, or similar) under given conditions (e.g. density, wind speed, rotor speed, pitch angles, or similar). As such, the aerodynamic performance map(s) may include power coefficients, thrust coefficients, torque coefficients, and/or partial derivatives with respect to pitch angle, rotor speed, or tip speed ratio. Alternatively, the aerodynamic performance maps can be dimensional power, thrust, and/or torque values instead of coefficients. Once the desired coefficients are known, the controller can control the wind turbine based thereon.

The aerodynamic performance map(s) mentioned above are static and are typically determined during a design stage of the wind turbine. Therefore, the aerodynamic performance map(s) are not dependent upon changing wind conditions that may be present during operation of the wind turbine, such as wind speed, turbulence intensity, wind shear, or sudden wind gusts. In addition, the aerodynamic performance map(s) do not account for blade twist.

Accordingly, a system and method for controlling a wind turbine that includes twist correction factors for the aerodynamic performance maps to account for blade twist would be desired in the art.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The method includes controlling, via a processor, the wind turbine based on at least one aerodynamic performance map. Further, the method includes determining at least one speed parameter of the wind turbine. Moreover, the method includes determining a blade torsional stiffness factor. Thus, the method further includes determining, via the processor, a twist correction factor for the aerodynamic performance map as a function of the at least one speed parameter and the blade torsional stiffness factor. The method then includes applying the twist correction factor to the at least one aerodynamic performance map to obtain an adjusted aerodynamic performance map. In addition, the method includes controlling the wind turbine based on the adjusted aerodynamic performance map.

In one embodiment, the speed parameter may include wind speed, rotor speed, generator speed, or any other speed parameter of the wind turbine.

In another embodiment, the method may further include determining the twist correction factor for the aerodynamic performance map as a function of air density, the speed parameter, and the blade torsional stiffness factor. For example, in one embodiment, the step of determining the twist correction factor for the aerodynamic performance map may include squaring the speed parameter, multiplying the air density by the squared speed parameter to obtain a multiplied value, and dividing the multiplied value by the blade torsional stiffness factor.

In further embodiments, the step of determining the twist correction factor for the aerodynamic performance map(s) may include utilizing one or more look-up tables, one or more equations, or a simulation model.

In several embodiments, the step of determining the blade torsional stiffness factor may include determining a scaling factor between a design torsional stiffness and an actual torsional stiffness of the rotor blade.

In particular embodiments, the step of applying the twist correction factor to the aerodynamic performance map(s) to obtain the adjusted aerodynamic performance map may include multiplying the power coefficient, a torque coefficient, or thrust coefficient obtained from the aerodynamic performance map(s) by the twist correction factor.

In certain embodiments, the method may further include automatically determining a revised tip-speed-ratio target and a revised pitch angle target as a function of the twist correction factor and/or other traditional inputs to aerodynamic performance maps.

In additional embodiments, the step of controlling the wind turbine based on the adjusted aerodynamic performance map may include implementing a control action comprising at least one of altering the pitch angle of a rotor blade, modifying a generator torque, modifying the generator speed, modifying the power output, yawing a nacelle of the wind turbine, braking one or more wind turbine components, or activating an airflow modifying element on a rotor blade.

In another aspect, the present disclosure is directed to a method for generating an aerodynamic performance map for use by a wind turbine controller during wind turbine operation. The method includes determining at least one speed parameter of the wind turbine. The method also includes determining, via the wind turbine controller, a blade torsional stiffness factor. Further, the method includes determining, via the wind turbine controller, a twist correction factor for the aerodynamic performance map as a function of the at least one speed parameter and the blade torsional stiffness factor. The method further includes generating the aerodynamic performance map based one the twist correction factor, tip speed ratio values, and pitch angles of the rotor blade. It should be understood that the method may further include any of the additional features and/or steps as described herein.

In yet another aspect, the present disclosure is directed to a system for controlling a wind turbine having a rotor with at least one rotor blade. The system includes one or more sensors configured to monitor at least one speed parameter of the wind turbine and a wind turbine controller having at least one processor. The processor is communicatively coupled to the one or more sensors. Further, the processor is configured to perform one or more operations, including but not limited to controlling the wind turbine based on at least one aerodynamic performance map, determining at least one speed parameter of the wind turbine, determining a blade torsional stiffness factor, determining a twist correction factor for the aerodynamic performance map as a function of the at least one speed parameter and the blade torsional stiffness factor, applying the twist correction factor to the at least one aerodynamic performance map to obtain an adjusted aerodynamic performance map, and controlling the wind turbine based on the adjusted aerodynamic performance map. It should be understood that the system may further include any of the additional features and/or steps as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a twist correction factor for an aerodynamic performance map used in wind turbine control systems and methods of determining same. Aerodynamic performance maps are generally static shapes for uniform inflow conditions. However, in actual wind turbine operation, rotor blade shape and inflow wind conditions are known to vary from the original design conditions that assume idealized conditions. To account for such variations, the present disclosure includes a twist correction factor that can be used to generate and/or modify the aerodynamic performance map(s) within the wind turbine control system. More specifically, the twist correction factors described herein are configured to account for blade deflection and twist.

As such, the aerodynamic performance map(s) described herein correct for blade twist to prevent errors in thrust and wind speed estimates. Thus, if the wind turbine is thrust limited, the blade twist correction allows for operation at a higher design thrust to get more energy in the knee of the power curve. Further, the aerodynamic performance map(s) described herein automatically dictate how the optimal tip speed ratio (TSR) and pitch angle change as a function of blade twist, thereby allowing the controller to pitch the blade more towards power in instances wherein the blade tip is twisting to feather. In addition, the controller can recover power loss by staying closer to the optimal angle of attack near the blade tip. Thus, the aerodynamic performance map(s) of the present disclosure provide more accurate thrust and wind speed estimations and improved recovery of power loss due to blade twist.

Figure 1:
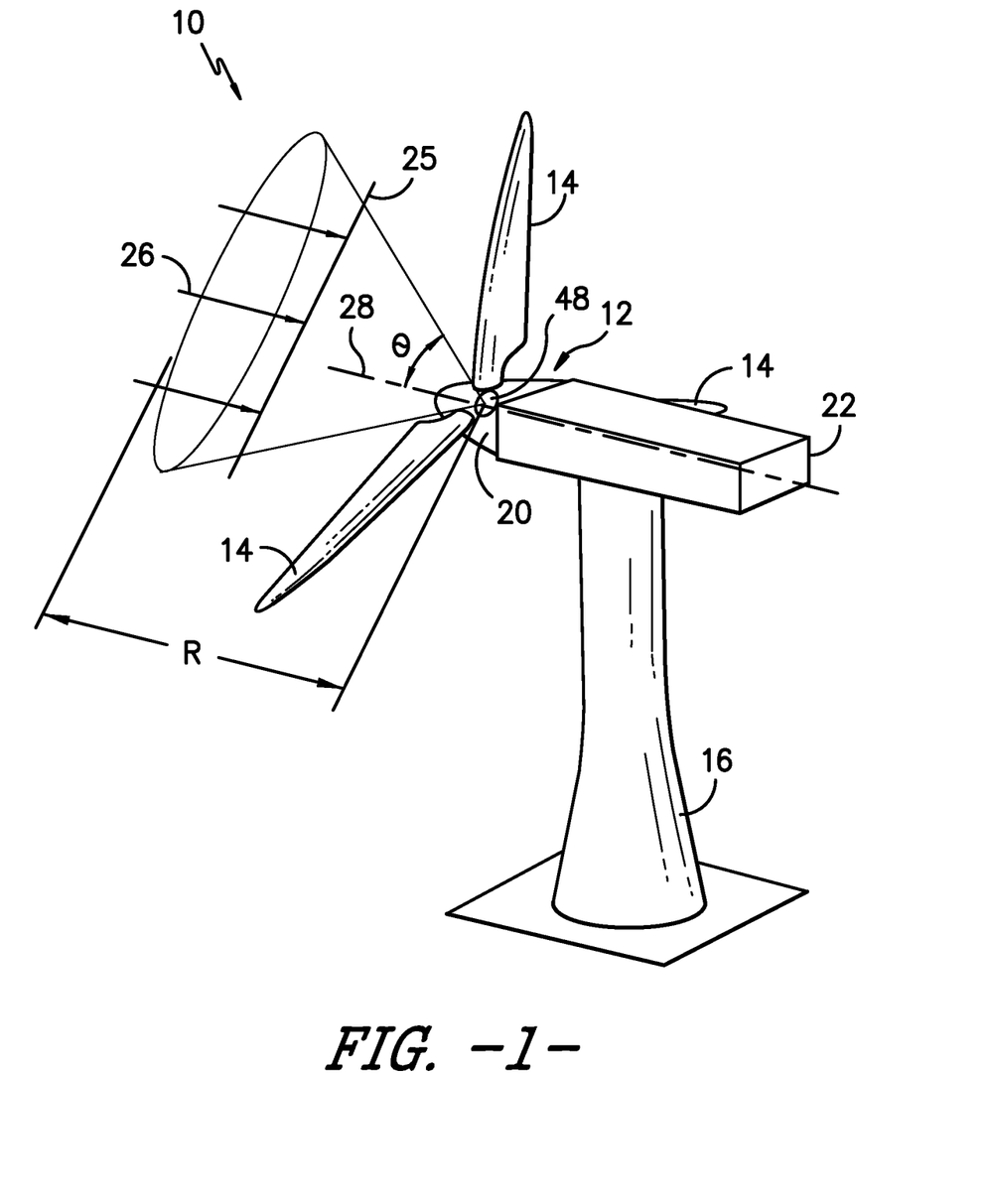
FIG. 1 illustrates a perspective view of one embodiment of a wind turbine according to the present disclosure.

Referring now to the drawings, FIG. 1 illustrates a wind turbine 10 in accordance with aspects of the present disclosure. As shown, the wind turbine 10 comprises a rotor 12 having a plurality of rotor blades 14 mounted on a hub 20. The wind turbine 10 also includes a nacelle 22 that is mounted atop a tower 16. The rotor 12 is operatively coupled to an electrical generator 24 (FIG. 2) housed within the nacelle 22. The tower 16 exposes the rotor blades 14 to the wind (directionally represented by arrow 26), which causes the rotor blades 14 to rotate about an axis 28. As such, the rotor blades 14 transform the kinetic energy of the wind into a rotational torque, which is further transformed into electrical energy via the electrical generator 24.

Figure 2:
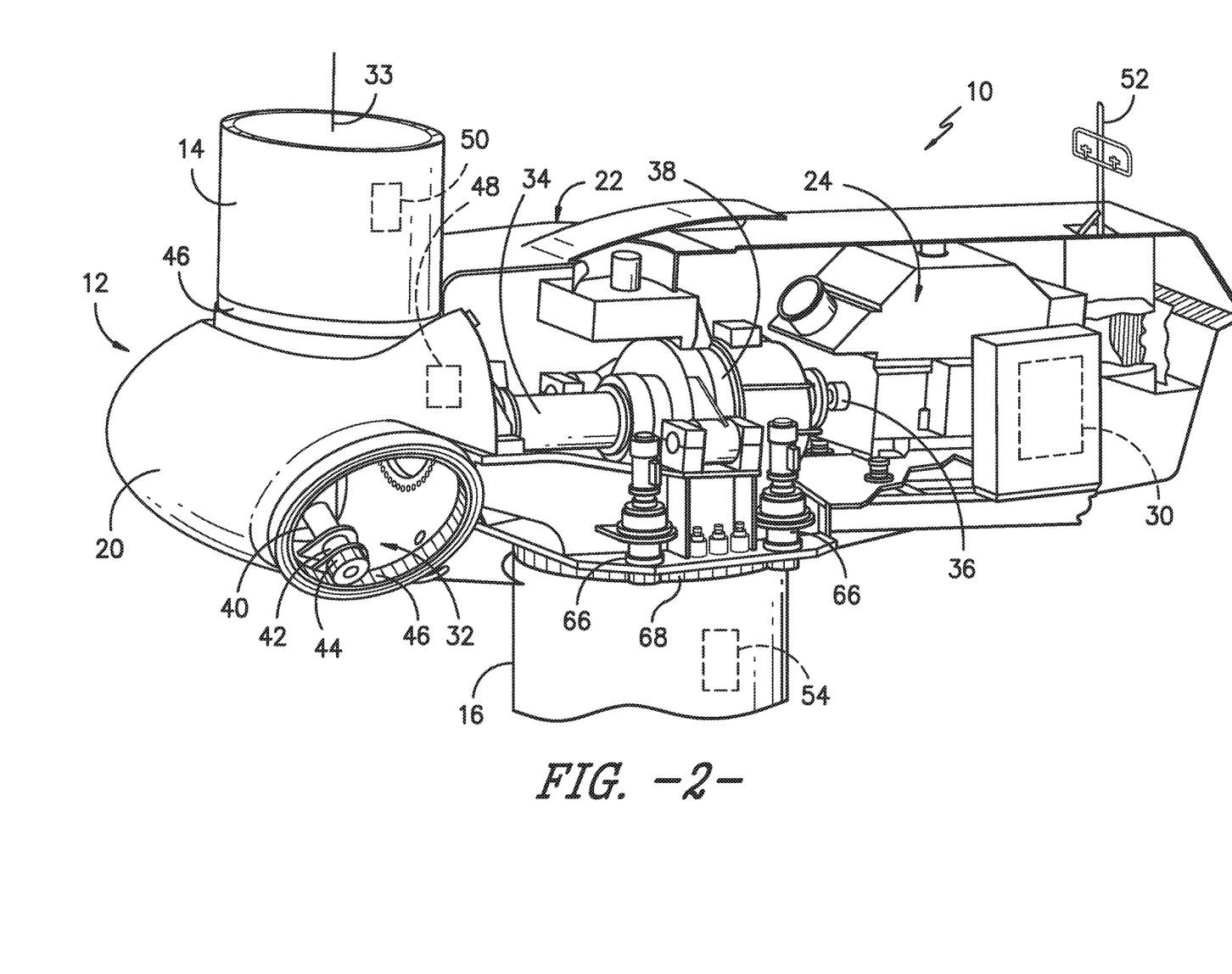
FIG. 2 illustrates a simplified, internal view of one embodiment of a nacelle of a wind turbine according to the present disclosure.

Referring now to FIG. 2, a simplified, internal view of one embodiment of the nacelle 22 of the wind turbine 10 shown in FIG. 1 is illustrated. As shown, the generator 24 may be disposed within the nacelle 22. In general, the generator 24 may be coupled to the rotor 12 for producing electrical power from the rotational energy generated by the rotor 12. For example, as shown in the illustrated embodiment, the rotor 12 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 14 and the hub 20. The gearbox 38 may then be configured to convert the low speed, high torque input to a high speed, low torque output to drive the generator shaft 36 and, thus, the generator 24.

The wind turbine 10 may also include a controller 30 centralized within the nacelle 22. Alternatively, the controller 30 may be located within any other component of the wind turbine 10 or at a location outside the wind turbine 10. Further, the controller 30 may be communicatively coupled to any number of the components of the wind turbine 10 in order to control the operation of such components and/or implement various correction actions as described herein. As such, the controller 30 may include a computer or other suitable processing unit. Thus, in several embodiments, the controller 30 may include suitable computer-readable instructions that, when implemented, configure the controller 30 to perform various different functions, such as receiving, transmitting and/or executing wind turbine control signals. Accordingly, the controller 30 may generally be configured to control the various operating modes (e.g., start-up or shut-down sequences), de-rate the wind turbine, and/or control various components of the wind turbine 10 as will be discussed in more detail below.

Still referring to FIG. 2, each rotor blade 14 may also include a pitch adjustment mechanism 32 configured to rotate each rotor blade 14 about its pitch axis 33. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 14 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 14 about the pitch axis 33. Similarly, the wind turbine 10 may include one or more yaw drive mechanisms 66 communicatively coupled to the controller 30, with each yaw drive mechanism(s) 66 being configured to change the angle of the nacelle 22 relative to the wind (e.g., by engaging a yaw bearing 68 of the wind turbine 10).

Figure 3:
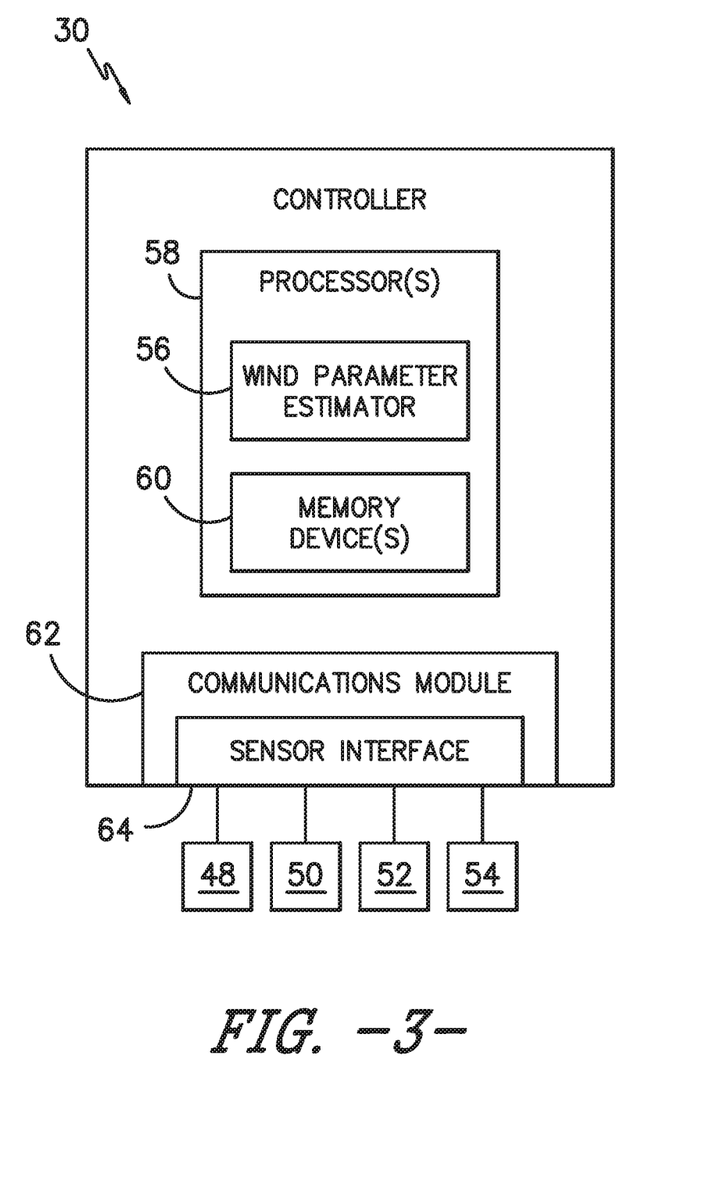
FIG. 3 illustrates a block diagram of one embodiment of suitable components that may be included in a controller of a wind turbine according to the present disclosure.

Referring generally to FIGS. 1-3, the wind turbine 10 may include one or more sensors 48, 50, 52, 54 for measuring various wind parameters of the wind turbine 10. For example, as shown in FIG. 1, sensor 48 is located on the hub 20 so as to measure an actual wind parameter upwind from the wind turbine 10. The actual wind parameter may be any of the following: a wind gust, a wind speed, a wind direction, a wind acceleration, a wind turbulence, a wind shear, a wind veer, a wake interference, or similar. Further, the sensor(s) 48, 50, 52, 54 may include at least one LIDAR sensor for measuring upwind parameters. For example, as shown in FIG. 1, LIDAR sensor 48 is a measurement radar configured to scan an annular region around the wind turbine 10 and measure wind speed based upon reflection and/or scattering of light transmitted by the LIDAR sensor from aerosol. The cone angle ($\theta$) and the range (R) of the LIDAR sensor 48 may be suitably selected to provide a desired accuracy of measurement as well as an acceptable sensitivity.

In the illustrated embodiment, the sensors 48, 50, 52, 54 are located on the hub 20 whereupon the rotor blades 14 are mounted. In further embodiments, the sensor(s) 48, 50, 52, 54 may also be located near the base of the wind turbine tower 16, on one or more of the rotor blades 14, on the nacelle 22, on a meteorological mast of the wind turbine 10, or at any other suitable location. In still further embodiments, the sensor(s) 48, 50, 52, 54 may be located in any suitable location on or near the wind turbine 10. Further, the sensor(s) 48, 50, 52, 54 may be configured to measure a wind parameter ahead of at least one specific portion, typically the most significant sections of the rotor blades 14 in terms of contributions of those sections to aerodynamic torque on the rotor blades 14, e.g. sections close to the tips of the rotor blades 14. The points ahead of the rotor blades 14 at which wind speed is measured by the sensor(s) 48, 50, 52, 54 is represented by plane 25 as shown in FIG. 1.

In alternative embodiments, the sensor(s) 48, 50, 52, 54 may be any other suitable sensors capable of measuring wind parameters upwind of the wind turbine 10. For example, the sensor(s) 48, 50, 52, 54 may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensor(s) 48, 50, 52, 54 may, for example, be used to generate signals relating to the parameter being monitored, which can then be utilized by the controller 30 to determine the actual condition.

Referring specifically to FIG. 3, there is illustrated a block diagram of one embodiment of the controller 30 according to the present disclosure. As shown, the controller 30 may include one or more processor(s) 58, a wind turbine condition estimator 56, and associated memory device(s) 60 configured to perform a variety of computer-implemented functions (e.g., performing the methods, steps, calculations and the like and storing relevant data as disclosed herein). Additionally, the controller 30 may also include a communications module 62 to facilitate communications between the controller 30 and the various components of the wind turbine 10. Further, the communications module 62 may include a sensor interface 64 (e.g., one or more analog-to-digital converters) to permit signals transmitted from the sensor(s) 48, 50, 52, 54 to be converted into signals that can be understood and processed by the processors 58. It should be appreciated that the sensor(s) 48, 50, 52, 54 may be communicatively coupled to the communications module 62 using any suitable means. For example, as shown in FIG. 3, the sensor(s) 48, 50, 52, 54 are coupled to the sensor interface 64 via a wired connection. However, in other embodiments, the sensor(s) 48, 50, 52, 54 may be coupled to the sensor interface 64 via a wireless connection, such as by using any suitable wireless communications protocol known in the art. As such, the processor 58 may be configured to receive one or more signals from the sensor(s) 48, 50, 52, 54.

The wind turbine condition estimator 56 may be considered software that utilizes operating data to calculate, in real-time, various wind turbine conditions. Further, the wind turbine condition estimator 56 may comprise firmware that includes the software, which may be executed by the processor(s) 58. Further, the wind turbine condition estimator 56 may be in communication the various sensor(s) 48, 50, 52, 54 and devices of the wind turbine 10, which may provide the operating data to the wind turbine condition estimator 56.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 30 to perform various functions including, but not limited to, estimating one or more wind conditions of the wind turbine 10 based on the operating data, transmitting suitable control signals to implement control actions in response to the detection of transient wind conditions, and/or various other suitable computer-implemented functions.

Figure 4:
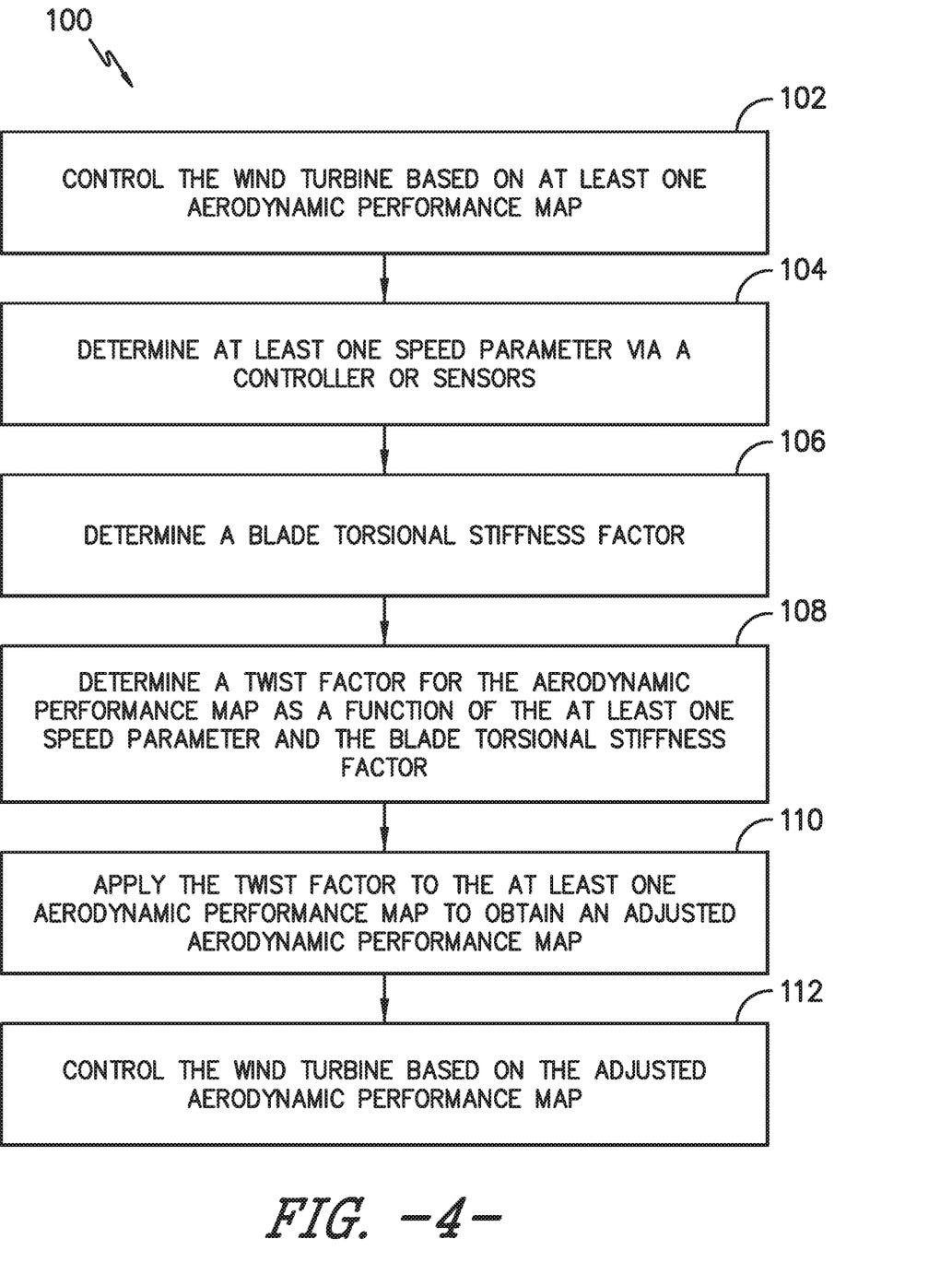
FIG. 4 illustrates a flow diagram of one embodiment of a method for controlling a wind turbine based on an adjusted aerodynamic performance map according to the present disclosure.

Referring now to FIG. 4, a flow diagram of a method 100 for controlling the wind turbine 10 according to the present disclosure is illustrated. For example, as shown at 102, the method 100 includes controlling the wind turbine 10 based on at least one aerodynamic performance map. The aerodynamic performance map(s) described herein generally refer to dimensional or non-dimensional tables or graphs that describe rotor loading and performance (e.g. power, thrust, torque, or bending moment, or similar) under given conditions (e.g. density, wind speed, rotor speed, pitch angles, or similar). As such, the aerodynamic performance map(s) may include: power coefficient, thrust coefficient, torque coefficient, and/or partial derivatives with respect to pitch angle, rotor speed, or tip speed ratio (TSR). Alternatively, the aerodynamic performance map(s) can be dimensional power, thrust, and/or torque values instead of coefficients.

Referring still to FIG. 4, as shown at 104, the method 100 includes determining at least one speed parameter of the wind turbine 10. More specifically, the speed parameter may be monitored using one or more of the sensor(s) 48, 50, 52, 54 and/or may be determined or estimated via the controller 30. For example, in one embodiment, the speed parameter may include wind speed, rotor speed, generator speed, or any other speed parameter of the wind turbine 10. Further, it should be understood that the speed parameter, for example the wind speed, may be a blade-specific wind speed which can be different due to wind shear, tower shadow, etc.

As shown at 106, the method 100 includes determining a blade torsional stiffness factor. For example, in one embodiment, the blade torsional stiffness factor may be equal to a scaling factor between a design torsional stiffness and an actual torsional stiffness of the rotor blade.

As shown at 108, the method 100 includes determining a twist correction factor for the aerodynamic performance map as a function of the speed parameter(s) and the blade torsional stiffness factor. For example, in one embodiment, the processor(s) 58 may be configured to utilize one or more look-up tables, one or more equations, or a simulation model to determine the twist correction factors described herein. More specifically, in certain embodiments, the method 100 may include determining the twist correction factor for the aerodynamic performance map as a function of air density, the speed parameter, and the blade torsional stiffness factor. For example, in one embodiment, the controller 30 may determine the twist correction factor for the aerodynamic performance map based on Equation (1) below, wherein the controller 30 squares the speed parameter v, multiplies the squared speed parameter $v^2$ by the air density p to obtain a multiplied value and then divides the multiplied value $\rho v^2$ by the blade torsional stiffness factor P_AdjGJSt.

$$\tau = \frac{\rho v^2}{P\_AdjGJSt} \qquad \text{Equation (1)}$$

In addition, it should be understood that the controller 30 may determine a blade-specific twist correction factor for each of the rotor blades 14. Thus, for a wind turbine with three rotor blades 14 as shown in FIG. 1, this will lead to three twist correction factors thereby leading to three adjusted power, thrust, or torque coefficients as described with respect to Equations (2)-(4) below.

Figure 5:
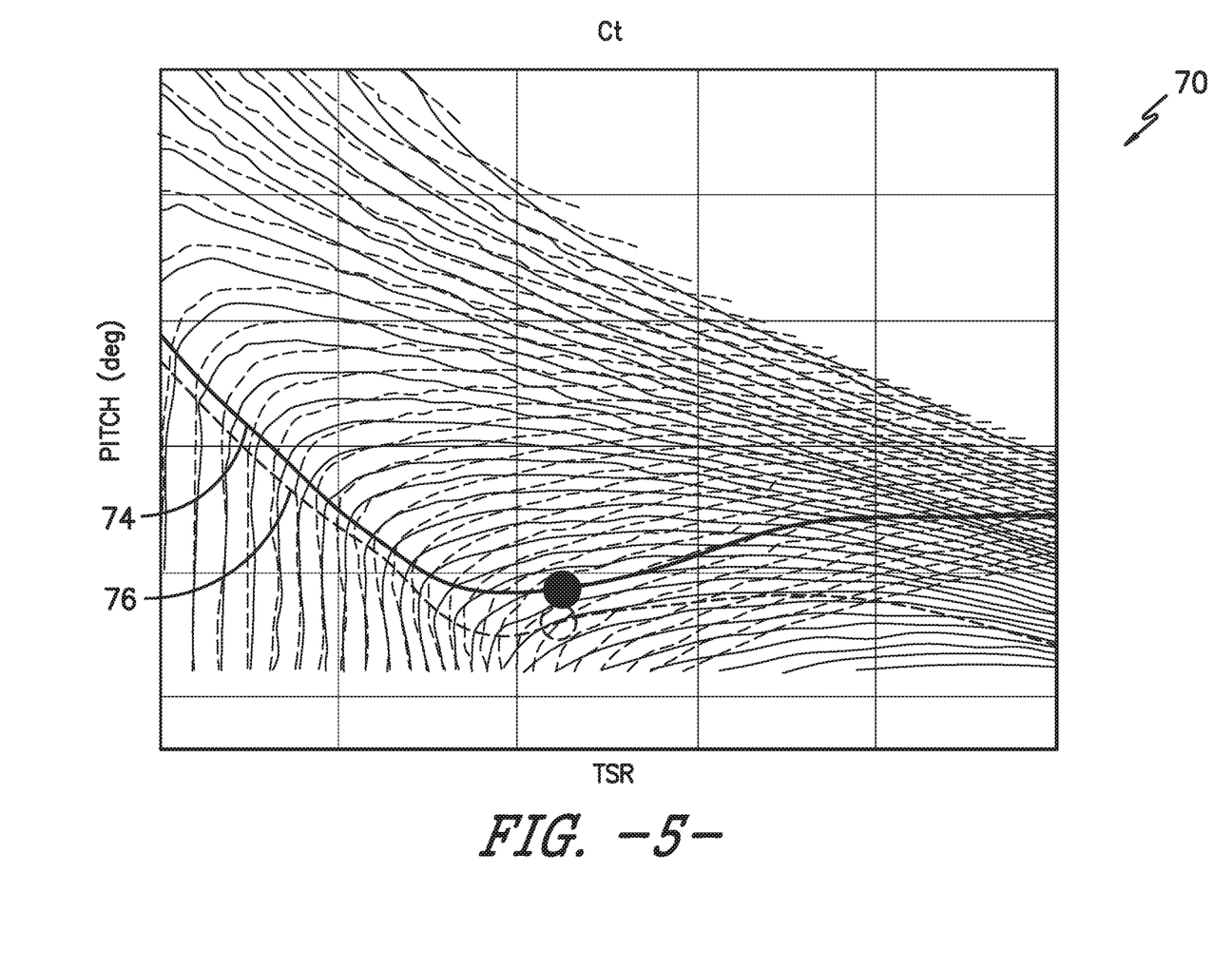
FIG. 5 illustrates a schematic diagram of one embodiment of an aerodynamic performance map according to conventional construction.
Figure 6:
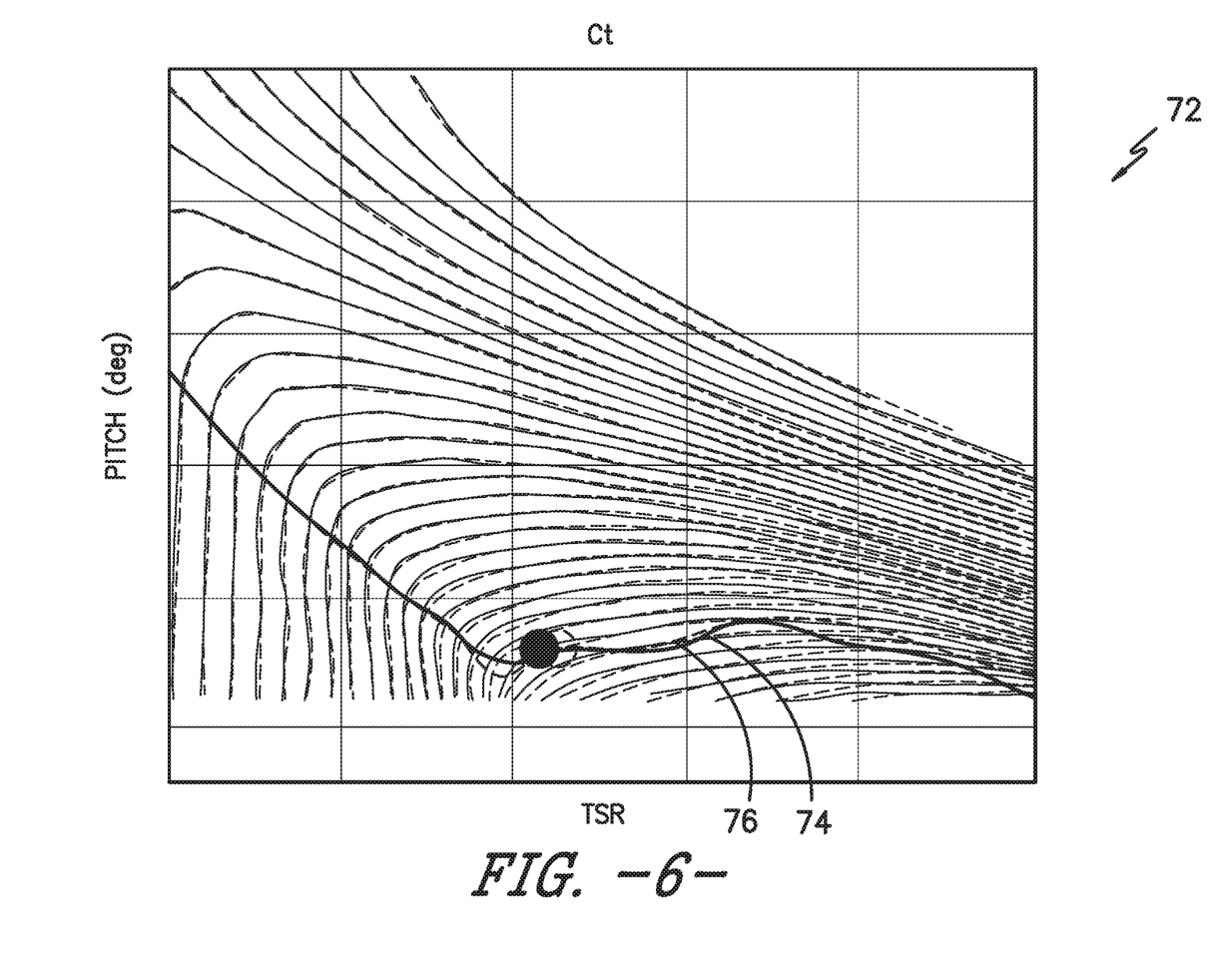
FIG. 6 illustrates a schematic diagram of one embodiment of an aerodynamic performance map according to the present disclosure.

Referring particularly to FIGS. 5 and 6, two aerodynamic performance maps 70, 72 are depicted to illustrate advantages of the twist correction factor. For example, as shown, the aerodynamic performance maps 70, 72 are graphs of pitch angle versus TSR that provides a corresponding thrust coefficient $C_t$. Further, as shown, each of the maps 70, 72 include simulations from a torsionally rigid rotor blade 74 and a flexible rotor blade 76. The map 70 of FIG. 5, however, illustrates how the map contours and the optimum pitch line starts to shift when only the density or only blade stiffness or only the wind speed is varied. In contrast, the map 72 of FIG. 6 illustrates how the variation is greatly reduced when certain combinations of the above variables, namely the twist correction factor ($\rho v^2$/P_AdjGJSt) does not change.

Referring back to FIG. 4, as shown at 110, the method 100 includes applying the twist correction factor to the aerodynamic performance map(s) to obtain an adjusted aerodynamic performance map. In particular embodiments, the step of applying the twist correction factor (e.g. $F_{TWIST\_POWER}$ and $F_{TWIST\_THRUST}$) to the aerodynamic performance map(s) to obtain the adjusted aerodynamic performance map may include multiplying the twist correction factor by a power coefficient, a torque coefficient, or thrust coefficient obtained from the aerodynamic performance map(s). The twist correction factors may be a function of one or more of the following parameters: wind speed, density, blade stiffness, P_AdjGJSt, twist correction factor, rotor speed, and/or generator speed.

For example, where the twist correction factor is based on rotor speed, the twist correction factor, $F_{TWIST}$ can be used to adjust the aerodynamic performance map, e.g. via Equations (2) and (3) below:

$$C_p = C_{pESTIMATOR} * F_{TWIST\_POWER} \qquad \text{Equation (2)}$$

$$C_{th} = C_{thESTIMATOR} * F_{TWIST\_THRUST} \qquad \text{Equation (3)}$$

$$C_{to} = C_{toESTIMATOR} * F_{TWIST\_TORQUE} \qquad \text{Equation (4)}$$

Where $C_p$ is the adjusted power coefficient,
$C_{th}$ is the adjusted thrust coefficient,
$C_{to}$ is the adjusted torque coefficient,
$C_{pESTIMATOR}$ is the power coefficient from the aerodynamic performance map,
$C_{thESTIMATOR}$ is the thrust coefficient from the aerodynamic performance map,
$C_{toESTIMATOR}$ is the torque coefficient from the aerodynamic performance map,
$F_{TWIST\_POWER}$ is the twist correction factor for the power coefficient,
$F_{TWIST\_THRUST}$ is the twist correction factor for the thrust coefficient, and
$F_{TWIST\_TORQUE}$ is the twist correction factor for the torque coefficient.

Thus, in certain embodiments, the method 100 may include adjusting one or more downstream estimates that depend on the adjusted coefficients. For example, such downstream estimates may include tower base moment, imbalance moment, blade root moment, etc. In certain embodiments, the method 100 may further include automatically determining a revised tip-speed-ratio (TSR) and a revised pitch angle as a function of the twist correction factor using the adjusted aerodynamic performance map.

Referring back to FIG. 4, as shown at 112, the method 100 includes controlling the wind turbine 10 based on the adjusted aerodynamic performance map(s). For example, in one embodiment, the wind turbine condition estimator 56 may implement a control algorithm having a series of equations to determine an estimated wind turbine condition as a function of the pitch angle, the generator speed, the power output, and the air density. Further, the equations may be solved using the operating data and the updated aerodynamic performance maps. Such control methodology provides accurate wind turbine control that maximizes power output and reduces excessive wind turbine loading. In alternative embodiments, the method 100 can also be used to increase performance. In such embodiments, the loads may increase.

In particular embodiments, the step of controlling the wind turbine based on the adjusted aerodynamic performance map may include implementing a control action. The control action(s) as described herein may be any suitable control action so as to reduce loads acting on the wind turbine 10. For example, in several embodiments, the control action may include temporarily de-rating or up-rating the wind turbine to permit the loads acting on one or more of the wind turbine components to be reduced or otherwise controlled. Up-rating the wind turbine, such as by up-rating torque, may temporarily slow down the wind turbine and act as a brake to help reduce loads. De-rating the wind turbine may include speed de-rating, torque de-rating or a combination of both. Further, the wind turbine may be de-rated by reducing speed and increasing torque, which can be beneficial so as to maintain power. In another embodiment, the wind turbine 10 may be de-rated by pitching one or more of the rotor blades 14 about its pitch axis 33. More specifically, the controller 30 may generally control each pitch adjustment mechanism 32 in order to alter the pitch angle of each rotor blade 14 between −10 degrees (i.e., a power position of the rotor blade 14) and 90 degrees (i.e., a feathered position of the rotor blade 14). In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 30 by transmitting a suitable control signal/command to the generator 24 in order to modulate the magnetic flux produced within the generator 24.

The wind turbine 10 may also be temporarily de-rated by yawing the nacelle 22 to change the angle of the nacelle 22 relative to the direction of the wind. In other embodiments, the controller 30 may be configured to actuate one or more mechanical brake(s) or activate an airflow modifying element on a rotor blade in order to reduce the rotational speed and/or load of the rotor blades 14, thereby reducing component loading. In still further embodiments, the controller 30 may be configured to perform any appropriate control action known in the art. Further, the controller 30 may implement a combination of two or more control actions.

Figure 7:
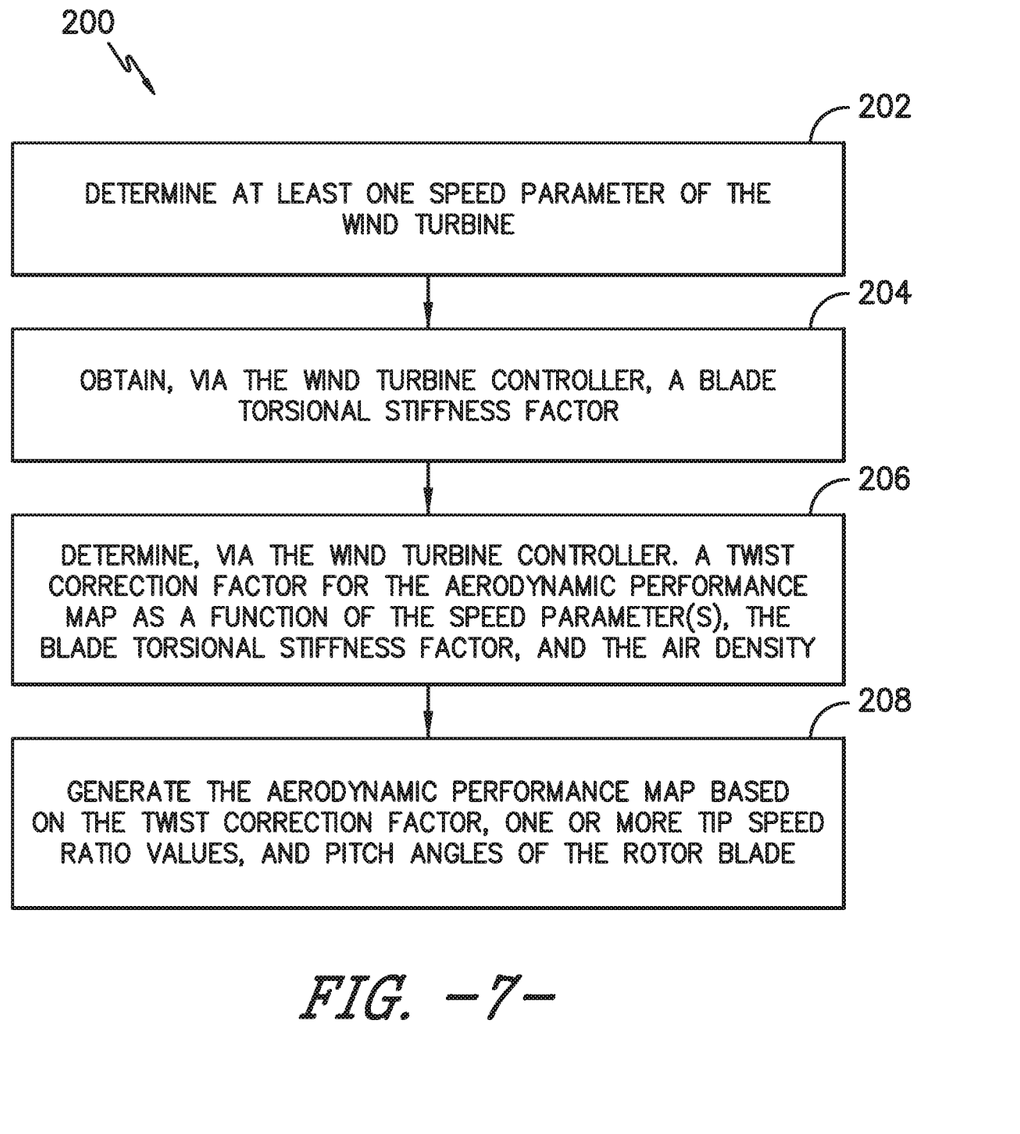
FIG. 7 illustrates a flow diagram of one embodiment of a method for generating an aerodynamic controller for use by a wind turbine controller according to the present disclosure.

Referring now to FIG. 7, a flow diagram of one embodiment of a method 200 for generating an aerodynamic performance map for use by the wind turbine controller 30 during wind turbine operation is illustrated. As shown at 202, the method 200 includes determining at least one speed parameter of the wind turbine 10. As shown at 204, the method 200 includes obtaining, via the wind turbine controller 30, a blade torsional stiffness factor. As shown at 206, the method 200 includes determining, via the wind turbine controller 30, a twist correction factor for the aerodynamic performance map as a function of the speed parameter(s), the blade torsional stiffness factor, and the air density. As shown at 208, the method 200 includes generating the aerodynamic performance map based on the twist correction factor, one or more tip speed ratio values, and pitch angles of the rotor blade 14.

It should also be appreciated that an advantage of the present invention is that the system and method may be implemented using existing components of the wind turbine 10. As such, a user is not required to purchase, install, and maintain new equipment. Further, the controller 30 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine having a rotor with at least one rotor blade, the method comprising:
   determining at least one speed parameter of the wind turbine;

determining a blade torsional stiffness factor;

calculating, via a processor, a product of air density and the at least one speed parameter or a function thereof;

determining a ratio of the product and the blade torsional stiffness factor, wherein the ratio represents a twist correction factor for the at least one rotor blade;

determining, via the processor, at least one of an adjusted power coefficient, an adjusted thrust coefficient, or an adjusted torque coefficient using the twist correction factor, a tip-speed-ratio, and a pitch angle as inputs to a graph of pitch angle versus tip-speed-ratio; and, controlling, via the processor, the wind turbine based on at least one of the adjusted power coefficient, the adjusted thrust coefficient, or the adjusted torque coefficient.

2. The method of claim 1, wherein the at least one speed parameter comprises at least one of wind speed, rotor speed, or generator speed of the wind turbine.

3. The method of claim 1, wherein determining the blade torsional stiffness factor further comprises determining a scaling factor between a design torsional stiffness and an actual torsional stiffness of the at least one rotor blade.

4. The method of claim 1, further comprising automatically determining a revised tip-speed-ratio and a revised pitch angle as a function of the twist correction factor using an adjusted aerodynamic performance map.

5. The method of claim 1, wherein controlling the wind turbine based on the at least one of the adjusted power coefficient, the adjusted thrust coefficient, or the adjusted torque coefficient further comprises implementing a control action comprising at least one of altering the pitch angle of the at least one rotor blade, modifying a generator torque, modifying the generator speed, modifying the power output, yawing a nacelle of the wind turbine, braking one or more wind turbine components, or activating an airflow modifying element on the at least one rotor blade.

6. A system for controlling a wind turbine having a rotor with at least one rotor blade, the system comprising:

a wind turbine controller comprising at least one processor, the at least one processor performing a plurality of operations, the plurality of operations comprising:

controlling the wind turbine based on at least one aerodynamic performance map; determining at least one speed parameter of the wind turbine;

determining a blade torsional stiffness factor;

calculating, via the at least one processor, a product of air density and the at least one speed parameter or a function thereof;

determining a ratio of the product and the blade torsional stiffness factor, wherein the ratio represents a twist correction factor for the at least one rotor blade;

determining, via the processor, at least one of an adjusted power coefficient, an adjusted thrust coefficient, or an adjusted torque coefficient using the twist correction factor, a tip-speed-ratio, and a pitch angle as inputs to a graph of pitch angle versus tip-speed-ratio; and, controlling the wind turbine based on at least one of the adjusted power coefficient, the adjusted thrust coefficient, or the adjusted torque coefficient.

7. The system of claim 6, wherein the at least one speed parameter comprises at least one of wind speed, rotor speed, or generator speed of the wind turbine.

8. The system of claim 6, wherein determining the blade torsional stiffness factor further comprises determining a scaling factor between a design torsional stiffness and an actual torsional stiffness of the at least one rotor blade.

9. The system of claim 6, further comprising automatically determining a revised tip-speed-ratio target and a revised pitch angle target as a function of the twist correction factor using an adjusted aerodynamic performance map.

* * * * *